(12) United States Patent
Xiang et al.

(10) Patent No.: US 7,432,988 B2
(45) Date of Patent: *Oct. 7, 2008

(54) ADDRESS GENERATION FOR VIDEO PROCESSING

(75) Inventors: Shuhua Xiang, Fremont, CA (US); Hongjun Yuan, San Jose, CA (US); Li Sha, San Jose, CA (US)

(73) Assignee: Micronas USA, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/710,772

(22) Filed: Feb. 26, 2007

(65) Prior Publication Data

US 2007/0153133 A1 Jul. 5, 2007

Related U.S. Application Data

(63) Continuation of application No. 10/205,884, filed on Jul. 25, 2002, now Pat. No. 7,184,101.

(60) Provisional application No. 60/309,239, filed on Jul. 31, 2001.

(51) Int. Cl.
*H04N 9/64* (2006.01)

(52) U.S. Cl. ....... 348/714

(58) Field of Classification Search ........ 348/714, 348/718, 699, 416, 415, 700
See application file for complete search history.

(56) References Cited

U.S. PATENT DOCUMENTS

| | | | | |
|---|---|---|---|---|
| 5,187,577 A | * | 2/1993 | Kim ............ | 348/614 |
| 5,299,144 A | * | 3/1994 | Bartkowiak et al. ...... | 708/200 |
| 5,341,492 A | * | 8/1994 | Sakata .......... | 710/66 |
| 6,038,675 A | * | 3/2000 | Gabzdyl et al. ...... | 713/600 |
| 6,122,000 A | * | 9/2000 | Yee et al. ........ | 348/51 |
| 6,323,788 B1 | * | 11/2001 | Kim et al. ....... | 341/81 |
| 6,591,381 B1 | * | 7/2003 | Kim et al. ....... | 714/701 |
| 7,184,101 B2 | * | 2/2007 | Xiang et al. ...... | 348/714 |

* cited by examiner

*Primary Examiner*—Paulos M Natnael
(74) *Attorney, Agent, or Firm*—Mayer Brown LLP

(57) ABSTRACT

A video processing system includes input and output address generators. The address generators are capable of generating linear addresses associated with data to be read from and written to a device. The linear address is converted to a random address so that data associated with a macroblock may be read from the device and written to the device.

4 Claims, 12 Drawing Sheets

ADDRESS GENERATION FOR VIDEO PROCESSING

CROSS-REFERENCE TO RELATED APPLICATIONS

This application claims priority under 35 U.S.C. § 119(e) to co-pending U.S. Provisional Patent Application No. 60/309,239, entitled "Video Processing System with Flexible Video Format," filed Jul. 31, 2001, by He Ouyang, et al. (referenced hereinafter as "the Video Processing Application"), the subject matter of which is incorporated by reference in its entirety herein.

This application is generally related U.S. patent application Ser. No. 10/209,109, now U.S. Pat. No. 6,996,702, entitled Processing Unit With Cross-Coupled ALUs/Accumulators And Input Data Feedback Structure Including Constant Generator And Bypass To Reduce Memory Contention, by Shuhua Xiang, et al. (referred hereinafter as "the Interleaved ALU Sub-system Application"), the subject matter of which is incorporated by reference in its entirety herein.

TECHNICAL FIELD

The present invention relates generally to video signal processing, and in particular to the generation of random burst addresses for the processing of video signals.

BACKGROUND OF THE INVENTION

For video processing applications, conventional address generation of pixel data, stored sequentially or according to horizontal raster lines, are increasingly ineffective when applied to the transfer of video data directed to objects moving across frames. Since the moving object itself may be of interest, the redundancies in pixel data between frames may not be of concern. That is, certain portions of an image remain in the same location from frame to frame, whereas other portions of the image (i.e., including the object) tend to move from frame to frame.

Where that portion of the image containing the object is of interest, it can be represented as a macroblock. Thus, when referencing the macroblock, a starting or base address of the macroblock is required, along with any offset sufficient to represent the size of the macroblock. The beginning of each line of the macroblock can be associated with a random address. The rest of the line for the macroblock can be associated with a corresponding offset. This representation avoids the need to process pixel data at all sequential addresses of the raster scan line. To process the video data sequentially in an attempt to discern the pixel data associated with the macroblock would be a waste of processing cycles. Rather, what is needed is a solution to process video data by using the random addresses associated with the macroblock in a manner that does not impact processing throughput.

SUMMARY OF THE INVENTION

The present invention overcomes the deficiencies and limitations of the prior art by providing a video processing system having a processing unit, and an input address generator coupled in parallel with an output address generator, wherein the input address generator and output address generator both include an object locator that maps or converts a linear address to a random address.

According to one embodiment, the object locator can be a lookup table that is stored with predetermined random addresses associated with the macroblock. The input address generator generates read addresses associated with data to be read from a device. The read addresses generated are linear addresses corresponding to the base address of the macroblock and corresponding offset addresses. Similarly, the output address generator generates write addresses associated with data to be stored in the device. The write addresses generated are linear addresses corresponding to the base address of the macroblock and corresponding offset addresses.

These base and offset addresses are linear addresses, which are then mapped to random addresses under the control of a state machine and transfer counter. By using a transfer count to associate a plurality of data transfers facilitated by the input address generator, a batch (or burst) of data transfers can be carried out by the address generator with minimum processing needed by the processing unit. The generation of random address is applied to both the input address generator and to the output address generator.

The features and advantages described in this summary and the following detailed description are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The teachings of the present invention can be readily understood by considering the following detailed description in conjunction with the accompanying drawings.

Figure 1:
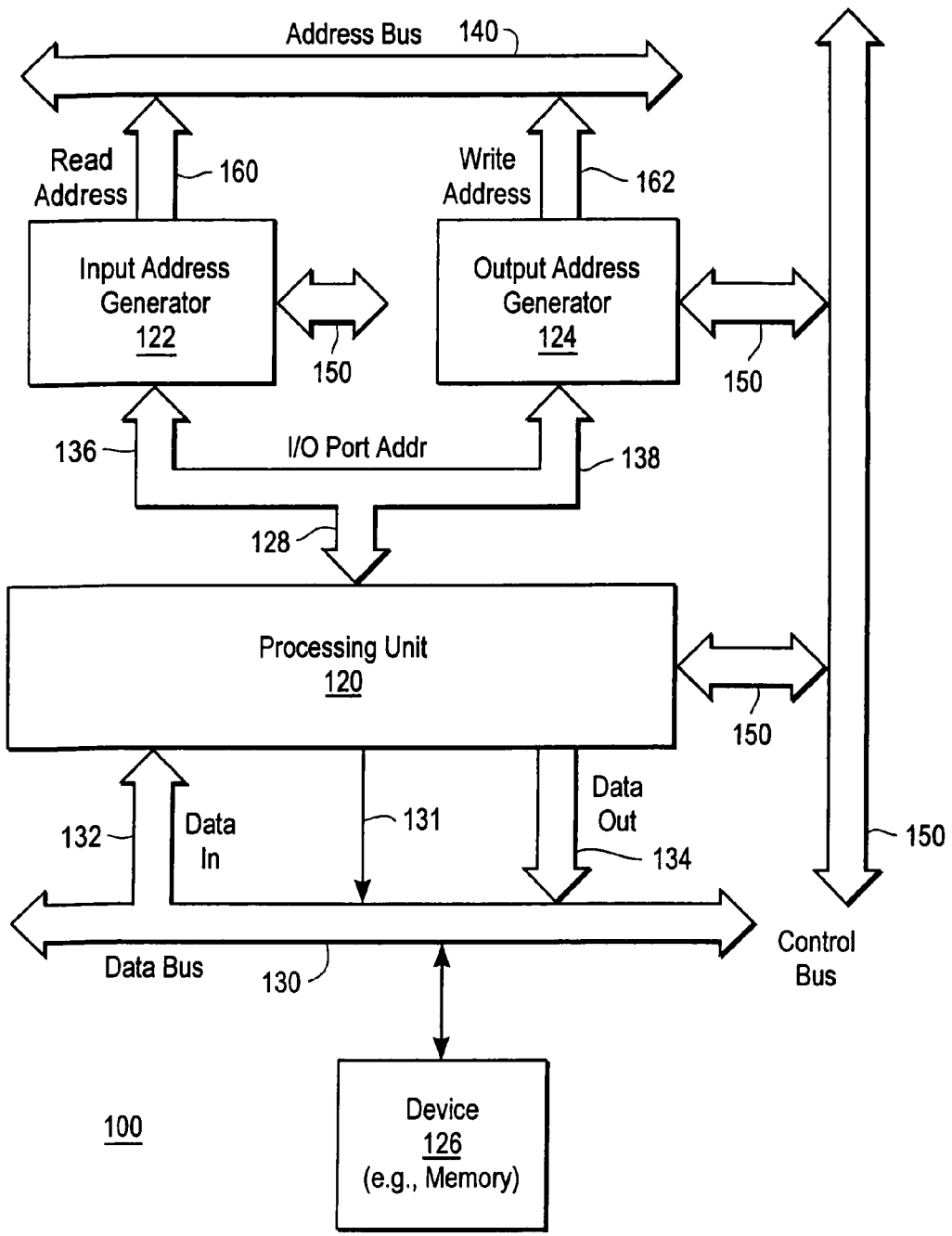
FIG. 1 is a block diagram of a processor system in accordance with one aspect of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Introduction

A system, method, and other embodiments for processing instructions representing a program are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention with unnecessary details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as (modules) code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or determining" or "displaying" or the like, refer to the action and processes of a computer system, or similar electronic computing device, that manipulates and transforms data represented as physical (electronic) quantities within the computer-based system memories or registers or other such information storage, transmission or display devices.

One aspect in accordance with the present invention includes an embodiment of the process steps and instructions described herein in the form of hardware. Alternatively, the process steps and instructions of the present invention could be embodied in firmware or a computer program (software), and when embodied in software, could be downloaded to reside on and be operated from different platforms used by video processing systems and multimedia devices employed with real time network operating systems and applications.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts to avoid obscuring the invention with unnecessary details.

Processor System Overview

In this section, FIGS. 1-3 will be described, with additional details being provided in the Interleaved ALU Sub-system Application, the subject matter of which is hereby incorporated by reference.

Referring to FIG. 1, there is shown an example of a processor system 100 comprising a processing unit 120, an input address generator 122, an output address generator 124, and a device 126. Device 126 may be a storage device such as memory, by way of example.

Processing unit 120 includes output signals lines 128. A data bus 130 couples processing unit 120 to storage device 126. In particular, signal lines 132 provide read (data_in) signals retrieved from device 126 over data bus 130 to processing unit 120. Also, signal lines 134 provide write (data_out) signals from processing unit 120 over data bus 130 to device 126. Signal lines 131 provide read and write control signal from processing unit 120 to data bus 130, as will be described in more detail with reference to FIG. 2.

Output signal lines 128 provide input port addresses over signal lines 136 from processing unit 120 to input address generator 122. Output signal lines 128 also provide output port addresses over signal lines 138 to output address generator 124. For example, the signal lines 136 and 138 may be read or write and latch enable signal lines.

Processor system 100 also includes a control bus 150, which provides control commands to various components, including the input address generator 122, the output address generator 124, and processing unit 120.

The input address generator 122 generates and provides to address bus 140 read addresses over signal lines 160. The read addresses are associated with read data from a device 126 over data bus 130 into processing unit 120. The output address generator 124 generates and provides to address bus 140 write addresses over signal lines 162. The write addresses are associated with write data written to device 126 over data bus 130 from processing unit 120 upon completion of processing.

One benefit of including the input address generator 122 and the output address generator 124 in processor system 100 is that because the read addresses and the write addresses are generated externally to processing unit 120, processing unit 120 need not include functionality to ascertain the read and write addresses, respectively. Accordingly, processing unit 120 can thereby process batch data seamlessly and devote its resources to other processing tasks. Data bus 130 couples the processing unit 120 to the device 126 and facilitates the transfer of read data over signal lines 132 and write data over signal lines 134. Typical video processing applications that can be performed by processing 120 include burst data move, matrix transposing, and video column processing, by way of example.

Figure 2:
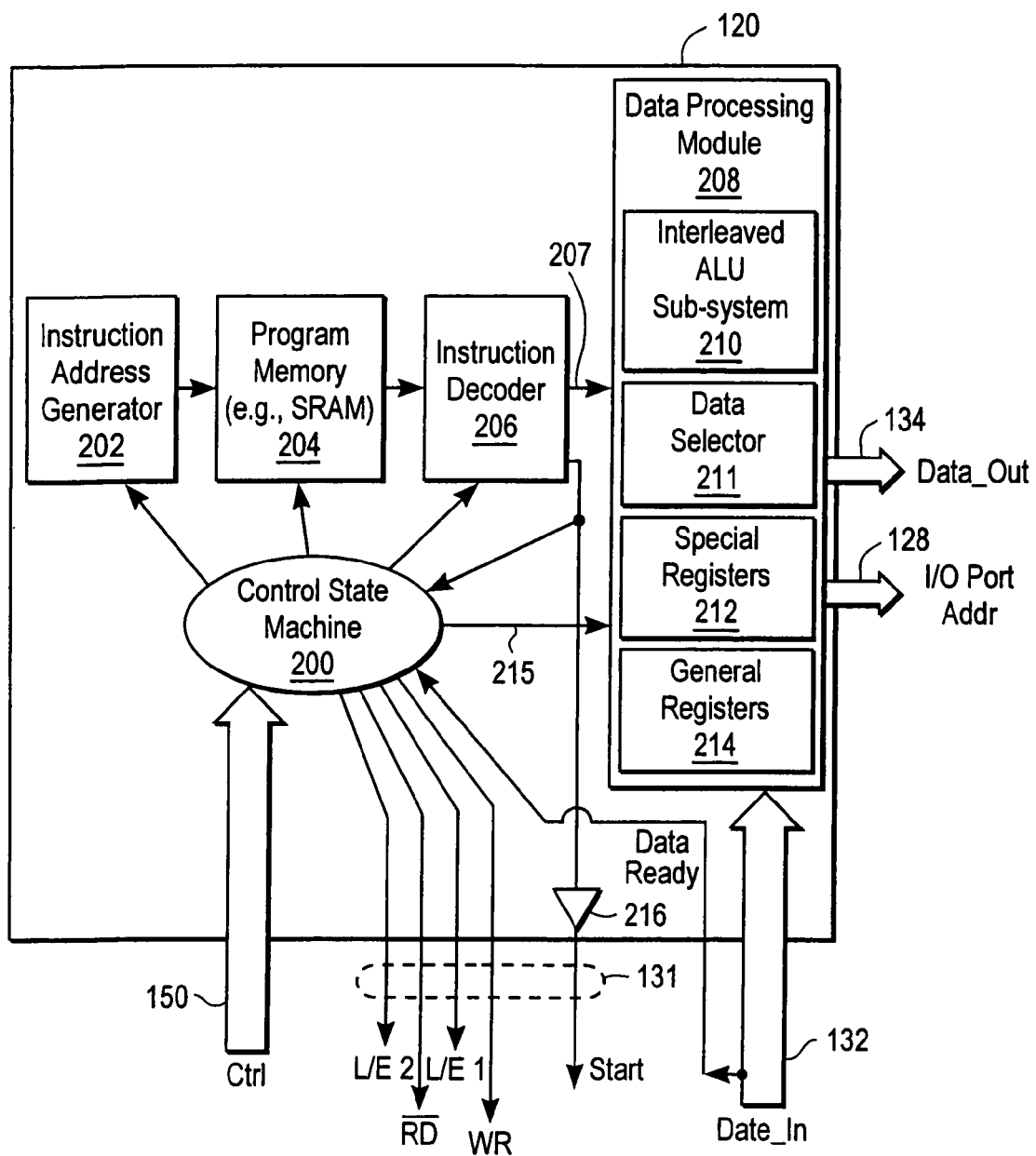
FIG. 2. is a block diagram of one embodiment of a processing unit for the system of FIG. 1.

FIG. 2 shows one embodiment of processing unit 120 in accordance with the present invention. Processing unit 120 includes a control state machine 200, an instruction address generator 202, a program memory 204, an instruction decoder 206, and a data processing module 208 (also known as a data path module). Instruction address generator 202 performs one or more address calculations associated with instruction words representing the program to be processed by the data processing module 208.

Control state machine 200 is coupled to the instruction address generator 202, the program memory 204, the instruction decoder 206, and the data processing module 208. Control state machine 200 can be conventionally designed to provide control for the behavior of sequential instructions to be processed by the processing unit 120, as will be understood by those skilled in the art. Additional details of control state machine 200 are not described so as to avoid obscuring the present invention with unnecessary details.

Program memory 204 stores the instructions (and/or microinstructions), typically at consecutive memory locations. It will be appreciated that such instructions can be loaded in program memory 204 as is known in the art. These instructions are generally executed sequentially one at a time. According to one particular implementation, program memory 204 is a static random access memory (SRAM). Although not shown explicitly, those of skill in the art will appreciate that program address generators that calculate the address of subsequent instructions after the execution of a current instruction is complete can be utilized in order to provide the instruction sequencing associated with execution of the instructions. The program memory 204 also receives an address generated by the instruction address generator 202 so as to index the corresponding instruction word stored therein. The program memory 204 further includes an output signal line coupled to the instruction decoder 206 in order to provide the instruction words indexed.

Instruction decoder 206 generally functions to convert the instruction binary code arising from (e.g., n-bit) coded inputs received from the program memory 204 into a plurality of (e.g., $2^n$) unique outputs, representing all of the address and control signals for operating the data processing module 208. These control signals are provided over signal lines 207 to the data processing module 208 and are a function of the output of the instruction decoder 206. In particular, instruction decoder 206 can be an n×m decoder capable of receiving the n-bit coded instruction words from the program memory 206 and of determining m corresponding decoded instructions or microinstructions (e.g., $m=2^n$) to be executed by the data processing module 208. Both n and m are integers. Each of the m outputs represents one of the combination of n binary input variables. Typically, an enable signal is activated to select one of the m decoded microinstructions. By way of example, 16-bits of a microinstruction binary code can be driven to the decoder data output, which is then multiplexed to either the data bus 130, or address bus 140 by the control commands transmitted over the control bus 150. In one embodiment, a hierarchical instruction set may be designed so as to reduce the combinational logic complexity and to improve the timing of the decoder 206. Once a decoded instruction is generated by the instruction decoder 206, a START command is generated by the control state machine 200. This START command can be temporarily stored in buffer 216 before being transmitted to the control bus 150 for use elsewhere in processor system 100.

Data processing module 208 processes input read data (data_in) signals received on signal lines 132. Module 208 also processes output write data (data_out), which is provided over signal lines 134. The processing function can perform arithmetic and logic calculations depending upon the decoded instructions (and/or microinstructions, if applicable) determined by decoder 206. Data processing module 208 includes an interleaved arithmetic logic unit (ALU) sub-system 210, data selector 211, special registers 212, and general registers 214.

Still referring to FIG. 2, one embodiment of control signal lines 131 includes a first latch enable signal line (L/E 1), a second latch enable signal line (L/E 2), read signal lines (RD), and write signal lines (WR).

Figure 3:
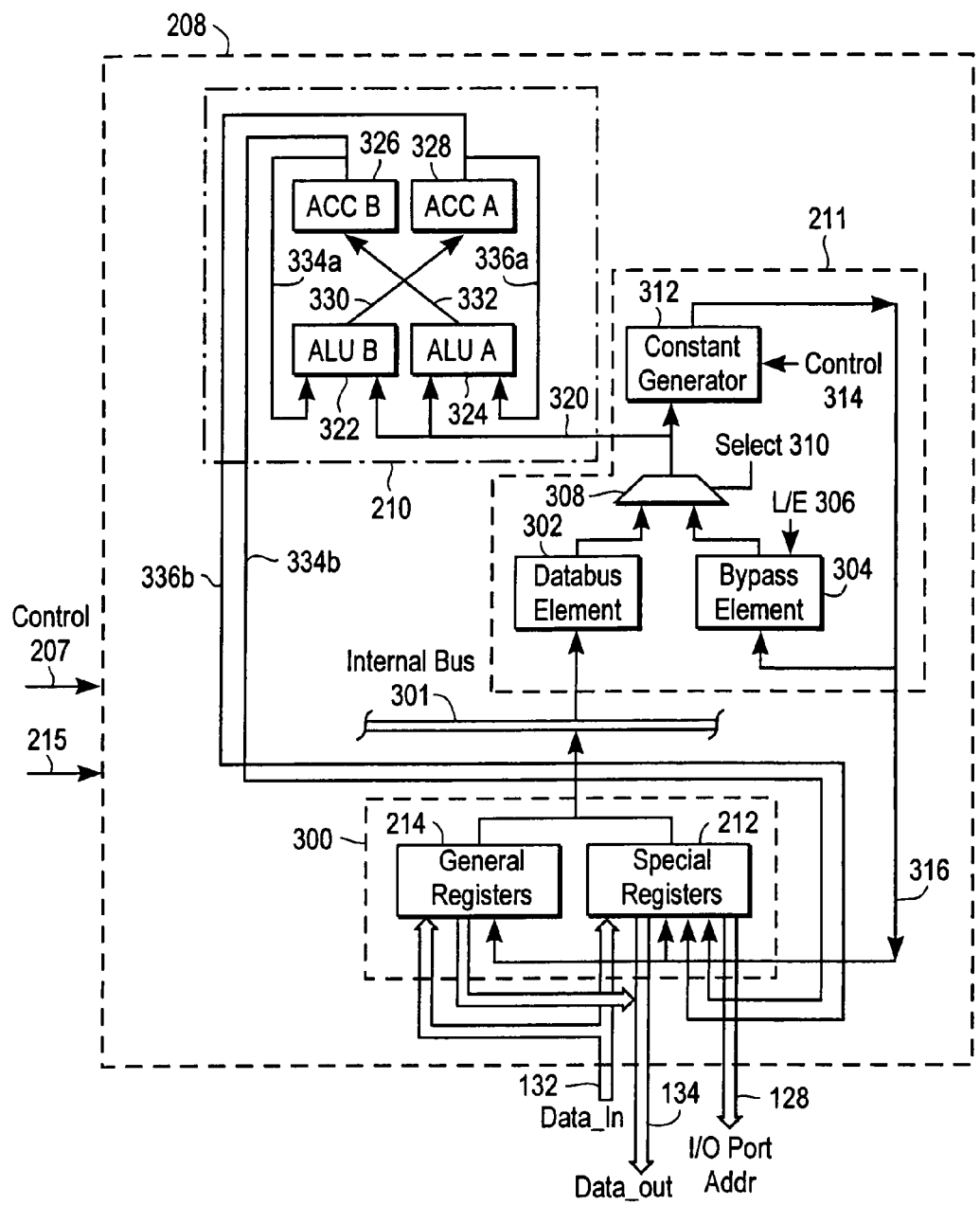
FIG. 3 is a detailed block diagram of one embodiment of the data processing module of FIG. 2 in accordance with an aspect of the present invention.

In FIG. 3, special registers 212 receive read data (data_in) from the device 126 over data bus 130 and signal lines 132. Additionally, special registers 212 provide write data (data_out) to device 126 over signal lines 134 and data bus 130. An Input/Output (I/O) port address signal line 128 couples the processing unit 120 to the input address generator 122 for read operations, and to output address generator 124 for write operations. This indication of read or write status facilitates an I/O addressing scheme applied to device 126, which can be analogized to being a device external to processor system 100. Using this analogy, those of skill in the art will understand that other devices coupled to the data bus 130 in FIG. 1 similarly to device 126 can be addressed by processor system 100 using the read and write indication along I/O address port signal line 128.

FIG. 3 depicts dashed box representative of I/O registers 300, which includes the special registers 212 and general registers 214, for convenience. One advantage of addressing the device 126 and other devices coupled to data bus 130 using input and output addresses is that such addressing provides processor system 100 with a simple and easily adaptable addressing scheme that can be applied to any type of device. For example, a motion compensation engine, variable length coding module, and multi-channel direct memory access device are exemplary devices that can be addressed by processor system 100 similar to device 126. Those of ordinary skill in the art will appreciate that a conventional addressing scheme may be used to access the external device.

General registers 214 receive pre-fetched data (e.g., data_in) over data bus 130 from the device 126. When write data (e.g., data_out) is to be written from the I/O registers 300 to the device 126, the general registers 214 outputs a write-data signal (not shown) to the control bus 150 to permit indication to the device 126 that write data is about to be placed on the data bus 130. Thereafter, the write data can be latched by device 126 and stored at the appropriate write address.

Data processing module 208 includes an interleaved ALU sub-system 210, special registers 212 and general registers 214, and data selector 211. Data selector 211 is coupled to an internal data bus 301, and comprises a databus element 302, a bypass storage element 304, a selector 308, and a constant generator 312.

According to one particular embodiment, by way of example, data processing module 208 provides 16-bit RISC operations and control. In that embodiment, a large register file is not required, but instead, a 3-stage pipeline control protocol can be used. Both single bit and fixed length burst input/output (I/O) is supported by this embodiment, and the general registers 214 and special registers 212, respectively, can be implemented as a 16×16 register file which can be read and written to by external memory device 126 using 4, 8 and 16 bursts, by way of example. During an 110 cycle which includes read and write cycles, interruption functions are disabled, although nested interruption is generally supported. Although not explicitly shown in FIG. 3, but as will be understood by those of ordinary skill in the art, special register 212 may include an internal stack depth of up to 256 words for use with each instruction word being of 18-bit width, by way of example. The program access range is selected to be 13-bits, and conditional and unconditional direct jump (JMP), relative jump and function call features are supported.

Once read data (data_in) is received by the I/O registers 300, the read data is then provided from the I/O registers 300 over the internal data bus 301 to the databus element 302. In one embodiment according to the present invention, databus element 302 is a register used to store selected data received from the I/O registers 300 via internal bus 301. Those of skill in the art will appreciate that databus element 302 functions as a selection register.

Bypass element 304 generally functions to hold feedback data output from the constant generator 312. In general, bypass element 304 stores data associated with a previous instruction for use with memory contention prediction. A latch enable (L/E) signal 306 is provided as an input to bypass element 304 in order to determine when data associated with a previous instruction should be latched. If memory contention associated with storage access to the same registers within I/O registers 300 occurs, the content of databus element 302 can be used for the next instruction or for subsequent instructions. Memory contention occurs when read and write instructions to the same address occur in the same clock (clk), as those of ordinary skill in the art will appreciate. The memory contention prediction can be implemented in a variety of ways in addition to the use of the bypass element 304 and databus element 302 discussed here.

In general, selector 308 determines whether data read from a source register within I/O registers 300 or data associated with a previous instruction and saved in the bypass element 304 to perform memory contention prediction will be selected for processing by the interleaved ALU subsystem 210. Selector 308 includes an input selection signal line 310, which is used to enable the selection of one of the two inputs provided to selector 308, namely inputs from databus element 302 and from bypass element 304. According to one embodiment, selector 308 may be implemented as a multiplexer.

Constant generator 312 receives an input control signal on signal line 314 and functions to generate a constant associated with an instruction. For example, one function of the constant generator 312 is to receive read data from the databus element 302, and to provide an output on signal line 316. This output on signal line 316 represents some constant which is generated as a result of the read data, and which will be part of an instruction and/or an operand that will be processed by the interleaved ALU sub-system 210 in a next instruction or a subsequent instruction. Output on signal line 316 is also transferred to the I/O registers 300 when write data is to written thereto prior to being transferred to the device 126, or when a constant needs to be stored in a destination register. By way of example, constant generator 312 includes conventional combinational logic to implement a bit set, bit clear, increment, and decrement instructions. The input control signal 314 can be generated by the instruction decoder 206 and provided over signal line 207.

Interleaved ALU sub-system 210 comprises a pair of accumulator registers 326 and 328 communicatively cross-coupled to a pair of arithmetic and logic units (ALUs) 322 and 324. In particular, accumulator 328 includes an output coupled to a first input of ALU 324 via signal line 336a. Similarly, accumulator 326 includes an output coupled to a first input of ALU 322 via signal line 334a. ALUs 322 and 324 each include a second input coupled to the output of selector 308, as indicated by signal line 320, to receive either the read data from the databus element 302 or the data stored in the bypass element 304. ALU 324 includes an output coupled to an input of accumulator 326 as indicated by signal line 332. ALU 322 includes an output coupled to an input of the accumulator 328 as indicated by signal line 330.

Input and Output Address Generators

Figure 4:
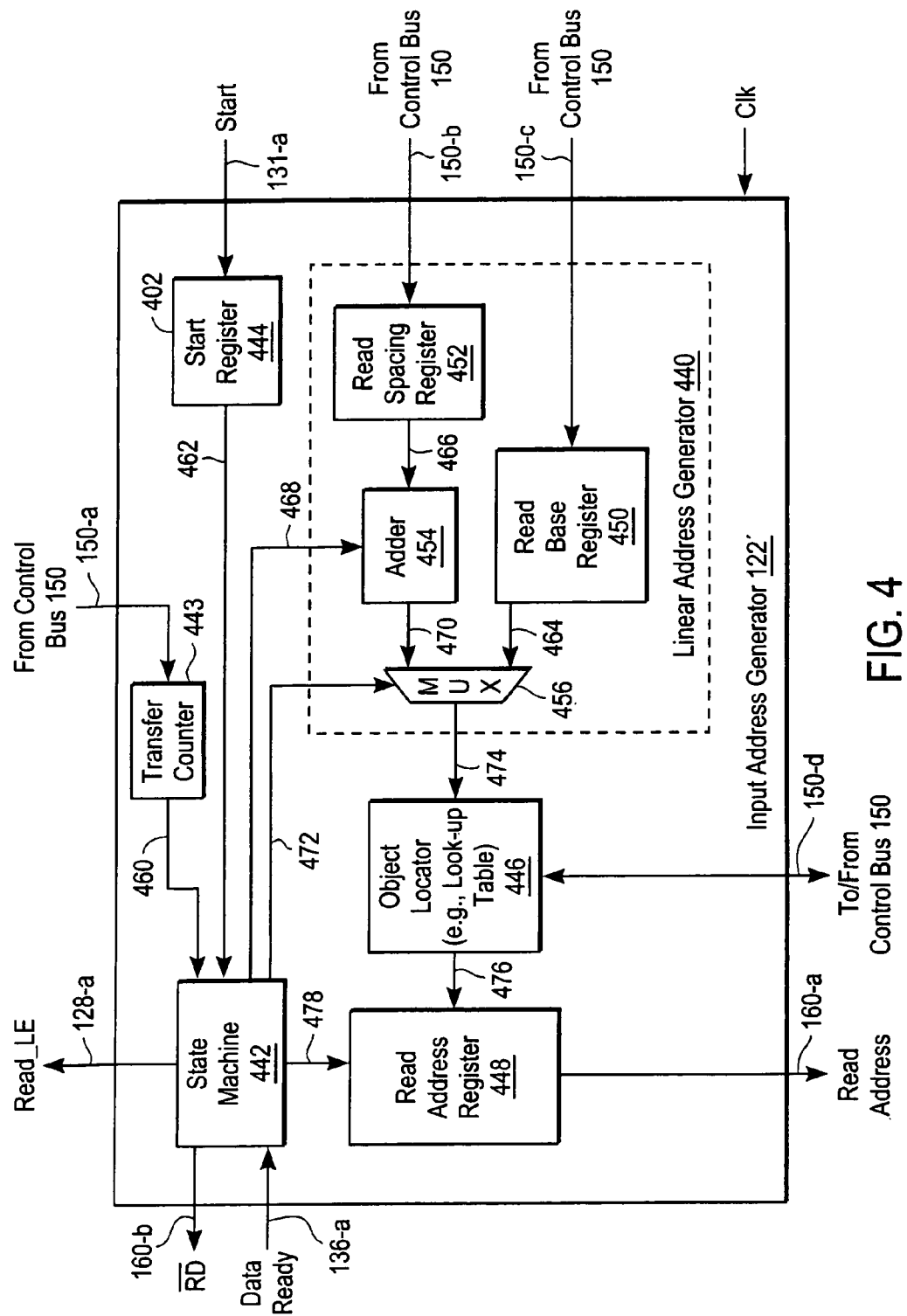
FIG. 4 is a detailed block diagram of one embodiment of the input address generator of FIG. 1.

FIG. 4 depicts one embodiment of the input address generator 122 of FIG. 1. In the embodiment, input address generator 122' includes a linear address generator 440, state machine 442, transfer counter 443, start register 444, object locator 446, and read address register 448. Linear address generator 440 comprises a read base register 450, read spacing register 452, adder 454 and selector 456. In general, linear address generator 440 functions to generate a base or offset address using the inputs received from the control bus 150.

The selector 456 can be a multiplexer, which selects either the base or offset address, which is thereafter provided to object locator 446. Object locator 446 functions to convert the linear address generated from linear address generator 440 to a random address. One implementation of object locator 446 is a look-up table (LUT) which is loaded with predetermined random addresses for corresponding linear addresses that have been determined for the macroblock. Those of skill in the art will appreciate that if object locator 446 is omitted from the embodiment of FIG. 4, then read address registers 448 will generate read address based on the linear address provided by linear address generator 440. Such read addresses are beneficial for the processing of pixel data saved in sequence, such as video data input stored sequentially according to a raster scan line.

Where a temporal component of pixel data is present in the video data to be processed, object locator 446 is beneficial for mapping the linear address generated to a random address. An example of the type of video data processing that works well with an embodiment of input address generator 122' that includes an object locator 446 involves reading one or more macroblocks of pixel data. For example, where video pixel data includes the movement of an object (such as a person's face) from frame to frame, random address generation of the object from a linear address would avoid having to process all video pixel data that is stored sequentially for each frame. Where the object locator 446 is a LUT, predetermined and pre-programmed random addresses can be easily determined from the linear address generated without the need to wait for the completion of the processing of video pixel data stored sequentially before that particular pixel data of interest is retrieved. By way of example, the input address generator 122' with object locator 446 is beneficial for the processing of video data in the format following the Moving Pictures Experts Group 4 (MPEG 4) standard.

The operation of input address generator 122' of FIG. 4 will now be described. Those of ordinary skill in the art will understand that pre-programmed control signals can be provided from control bus 150 to input address generator 122'. Such control signals includes control signals: (1) provided over signal line 150-a to load transfer counter 443 (e.g., register) with a maximum number of data transfers; (2) provided over signal line 150-b to load the read spacing register 452 with an offset address; (3) provided over signal line 150-c to load a read (data_in) address in the read base register 450; and (4) provided over signal line 150-d to load predetermined random addresses in the object locator 446. The maximum number of transfers loaded into transfer counter 443 is then provided to state machine 442 over signal line 460.

A START signal transmitted from processing unit 120 of FIG. 2 is provided over signal line 131-a to the start register 444, and in turn to state machine 442 over signal line 462. The base address is provided from read base register 450 over signal line 464 to selector 456. Should there be an offset address associated with the data to be read from device 126, the offset address from read spacing register 452 is provided to adder 454 over signal line 466. State machine 442 provides a control signal over signal line 468 to adder 454 to control whether the offset address will be provided over signal line 470 to selector 456. State machine provides a selection signal over signal line 472 to selector 456 to select one of the two inputs, either the base address or an offset address to be provided over signal line 474 to object locator 446. Object locator 446 determines the corresponding random address for data to be read from device 126, and provides such random address to read address register 448 over signal line 476.

Figure 11:
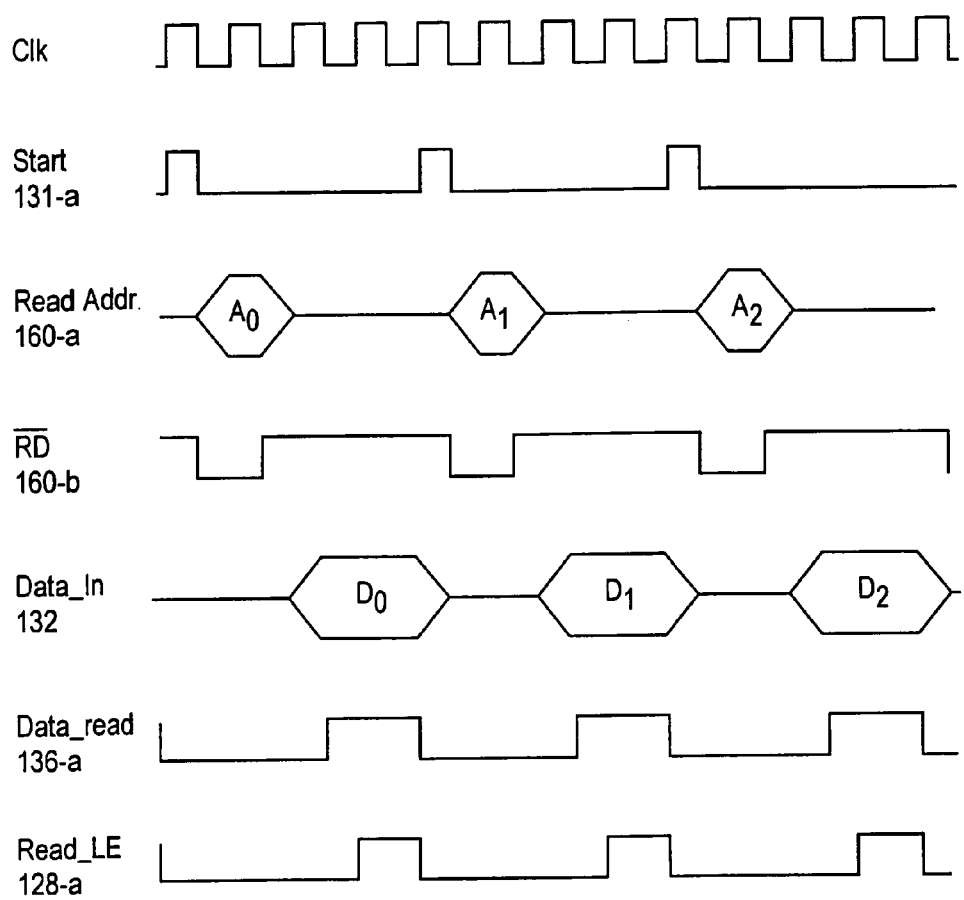
FIG. 11 is a timing diagram for the generation of input (read) batch data.

Referring to FIG. 11, state machine 442 provides a control signal over signal line 478 to address register 448, upon which the read address is placed on address bus 140 over signal lines 160. In particular embodiment of FIG. 4, signal lines 160 comprise the actual read address provided over signal lines 160-a, and a read signal $(RD)^{-1}$ provided over signal line 160-b. The read data (data_in) is then placed from device 126 on databus 130. When the data_ready signal is provided to state machine 442 over signal line 136-a from the I/O port address 128 (of FIG. 2), state machine 442 enables the read latch enable (READ_LE) over signal line 128-a, upon which the read data is latched from data bus 130 over signal lines 132 and into the processing unit 120. Those of ordinary skill in the art will understand that a system clock (clk) signal is provided, although not explicitly shown.

Figure 5:
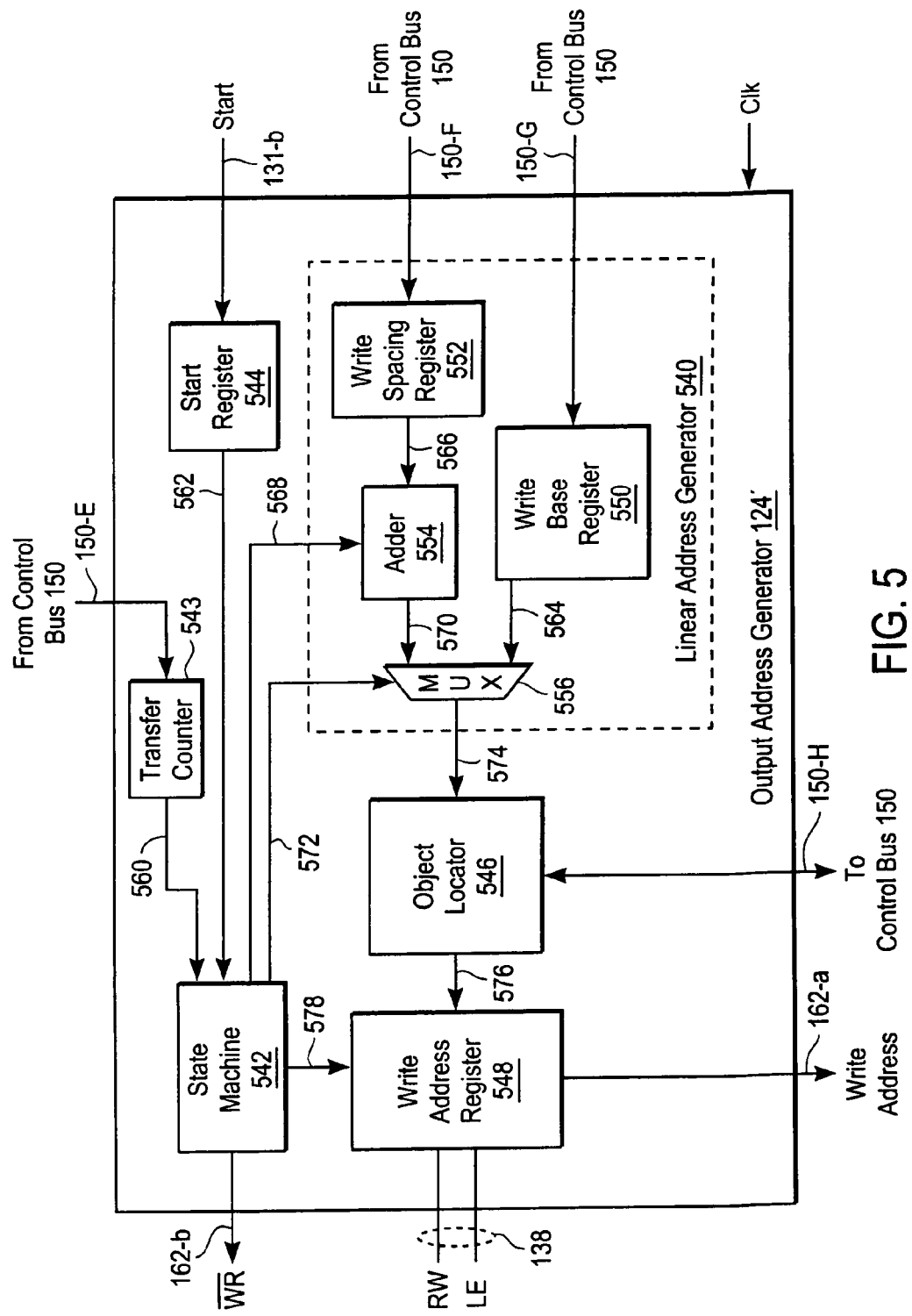
FIG. 5 is a detailed block diagram of one embodiment of the output address generator of FIG. 1.

FIG. 5 depicts one embodiment of the output address generator 124 of FIG. 1. In the embodiment, output address generator 124' includes a linear address generator 540, state machine 542, transfer counter 543, start register 544, object locator 546, and write address register 548. Linear address generator 540 comprises a write base register 550, write spacing register 552, adder 554 and selector 556. In general, linear address generator 540 functions to generate a base or offset address using the inputs received from the control bus 150.

The selector 556 can be a multiplexer, which selects either the base or offset address, which is thereafter provided to object locator 546. Object locator 546 functions to convert the linear address generated from linear address generator 540 to a random address in a similar manner as described with object locator 446 of FIG. 4. One implementation of object locator 546 is a look-up table (LUT) which is loaded with predetermined random addresses for corresponding linear addresses that have been determined. Those of skill in the art will appreciate that if object locator 546 is omitted from the embodiment of FIG. 5, then write address registers will generate write addresses based on the linear address provided by linear address generator 540. Such write addresses are beneficial for the processing of pixel data saved in sequence, such as video data input according to a raster scan line.

Where a temporal component of pixel data is present in the video data to be processed, object locator 546 is beneficial for mapping the linear address generated to a random address in a similar manner as described with object locator 446. Where the object locator 546 is a LUT, predetermined and pre-programmed random addresses can be easily determined from the linear address generated without the need to wait for the completion of the processing of video pixel data stored sequentially before that particular pixel data of interest.

The operation of output address generator 124' of FIG. 5 will now be described. Those of ordinary skill in the art will understand that pre-programmed control signals can be provided from control bus 150 to output address generator 124'. Such control signals includes control signals: (1) provided over signal line 150-e to load transfer counter 543 (e.g., register) with a maximum number of transfer; (2) provided over signal line 150-f to load the write spacing register 552 with an offset address; (3) provided over signal line 150-g to load a write (for data_out) address in the write base register 550; and (4) provided over signal line 150-h to load predetermined random addresses in the object locator 546. The maximum number of transfers loaded into transfer counter 543 is then provided to state machine 542 over signal line 560.

A START signal transmitted from processing unit 120 of FIG. 2 is provided over signal line 131-b to the start register 544, and in turn to state machine 542 over signal line 562. The base address is provided from write base register 550 over signal line 564 to selector 556. Should there be an offset address associated with the data to be written from processor 120 to device 126, the offset address from write spacing register 552 is provided to adder 554 over signal line 566. State machine 542 provides a control signal over signal line 568 to adder 554 to control whether the offset address will be provided over signal line 570 to selector 556. State machine provides a selection signal over signal line 572 to selector 556 to select one of the two inputs, either the base address or an offset address to be provided over signal line 574 to object locator 546. Object locator 546 determines the corresponding random address write data from device 126, and provides such random address to write address register 548 over signal line 576.

Figure 12:
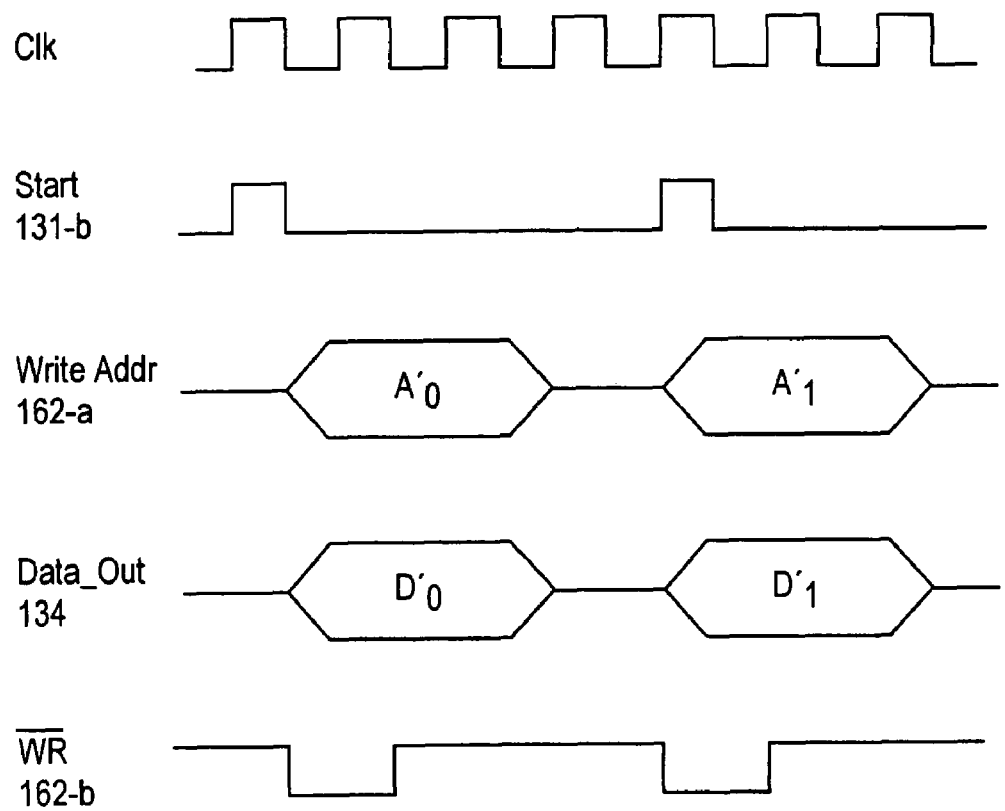
FIG. 12 is a timing diagram for the generation of output (write) batch data.

Referring to FIG. 12, a START signal is provided to the start register 544 over signal line 131-b. The read/write (R/W) and latch enable (LE) signals are provided over signal lines 138 from processing unit 120 to write address register 548. Thereafter, state machine 542 provides a control signal over signal line 578 to write address register 548, upon which an output (write) address is placed on address bus 140 over signal lines 162. In the particular embodiment of FIG. 5, signal lines 162 comprise the actual write address provided over signal lines 162-a, and a write signal $(WR)^{-1}$ provided over signal line 162-b. The output data (data_out) is then placed from processing unit 120 on databus 130 via signal lines 134, to be latched by device 126.

Figure 6:
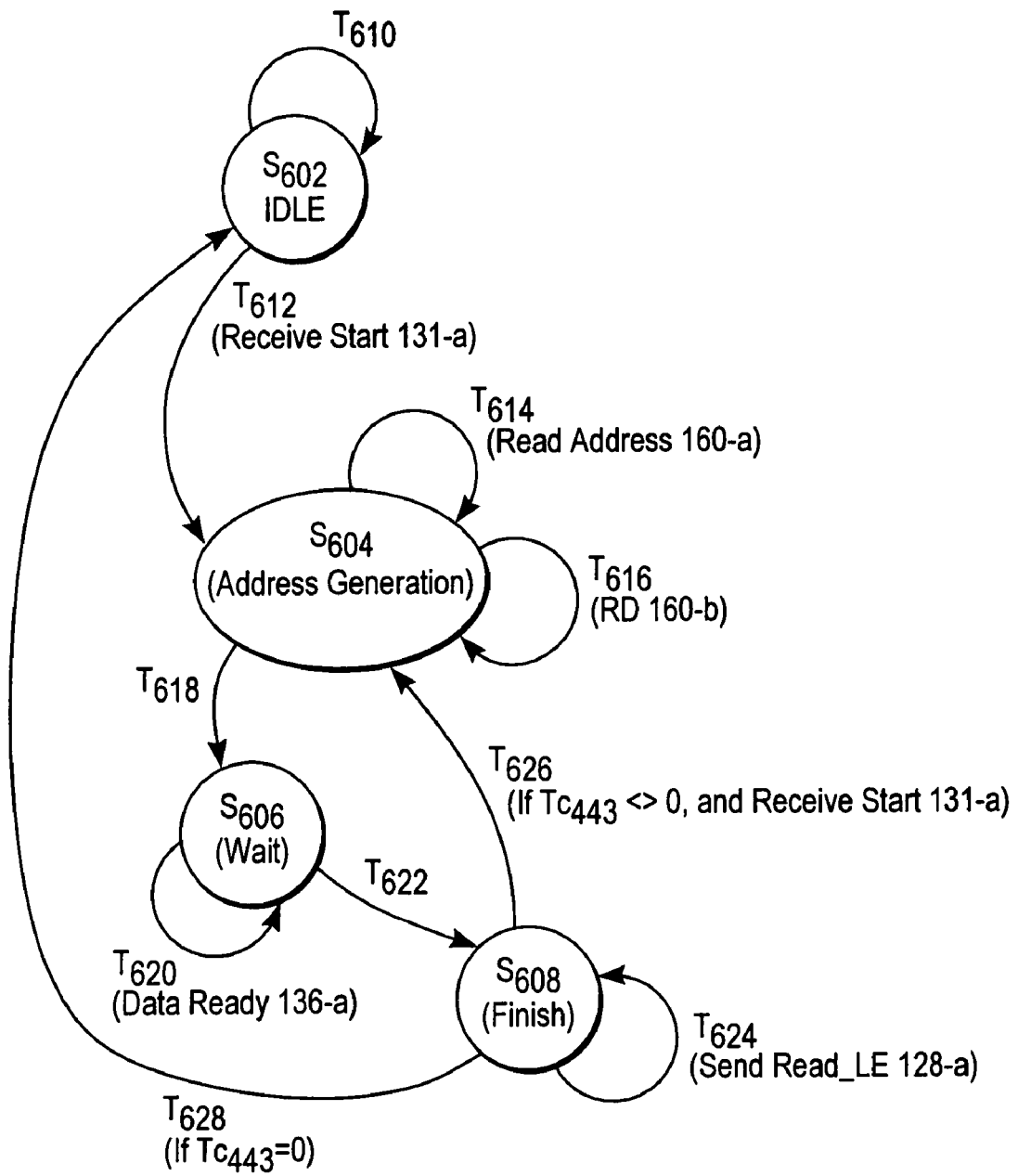
FIG. 6 is a state diagram for the state machine of input address generator of FIG. 4.

Reference is now made to the read state diagram 600 of FIG. 6 to describe the functionality of state machine 442 of FIG. 4. The read state diagram 600 comprises an idle state $S_{602}$, and address generation state $S_{604}$, a wait state $S_{606}$, and a finish state $S_{608}$. State machine 442 remains in the idle state $S_{602}$ to begin with, as indicated by transition $T_{610}$. When the START signal is received by the state machine 442 over signal line 462, state machine 442 changes from the idle state $S_{602}$ to the address generation state $S_{604}$, as indicated by transition $T_{612}$. During the address generation state, the random read addresses are generated over signal lines 160-$a$, as indicated by transition $T_{614}$. At the same time, the read signal $(RD)^{-1}$ is generated by the state machine 442 over signal line 160-$b$, as indicated by transition $T_{616}$. Thereafter, the state machine will change from the address generation state $S_{604}$ to the wait state $S_{606}$, as indicated by transition $T_{618}$. State machine 442 waits until the Data_Ready signal is received over signal line 136-$a$, as indicated by transition $T_{620}$. Upon the receipt of the Data_Ready signal, state machine changes to the finish state $S_{608}$, as indicated by transition $T_{622}$. State machine 442 generates the Read_LE signal over signal line 128-$a$, as indicated by transition $T_{624}$. The input address generator 122' processes the input data transfer by reading data_in, and upon completion of this data transfer, the state machine 442 decrements the value in the transfer counter 443. If the value of the transfer counter 443 is not equal to zero, and another START signal is received by the state machine 442 over signal line 462, the state machine changes from the finish state $S_{608}$ to the address generation state $S_{604}$, as indicated by transition $T_{626}$. The process of generating another random read address is then repeated as part of the batch (burst) mode of data transfer. However, if the value of the transfer counter 443 is zero, then the state machine 442 returns to the idle state $S_{602}$, as indicated by transition $T_{628}$. Upon returning to the idle state $S_{602}$, the input address generator 122' becomes available to receive the next batch of data transfers and a new corresponding transfer count value to be loaded into the transfer counter 443 from the control bus 150.

Figure 7:
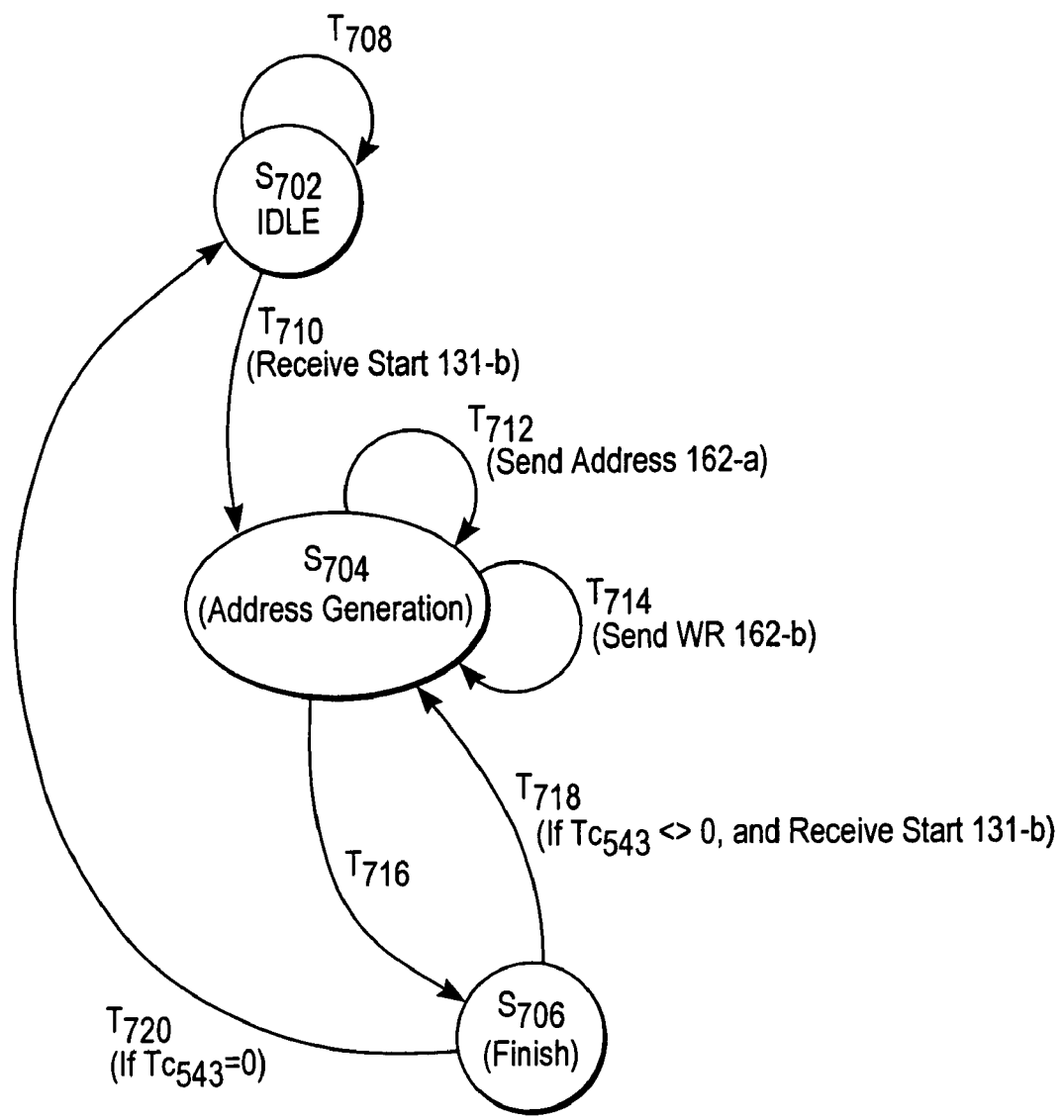
FIG. 7 is a state diagram for the state machine of output address generator of FIG. 5.

Reference is now made to the write state diagram 700 of FIG. 7 to describe the functionality of state machine 542 of FIG. 5. The write state diagram 700 comprises an idle state $S_{702}$, and address generation state $S_{704}$, and a finish state $S_{706}$. State machine 542 remains in idle state $S_{702}$ to begin with, as indicated by transition state $T_{708}$. When the START signal is received by the state machine 542 over signal line 562, state machine 542 changes from the idle state $S_{702}$ to the address generation state $S_{704}$, as indicated by transition $T_{710}$. During the address generation state $S_{704}$, the random write addresses are generated over signal lines 162-$a$, as indicated by transition $T_{712}$. At the same time, the write signal $(WR)^{-1}$ is generated by the state machine 542 over signal line 162-$b$, as indicated by transition $T_{714}$. Thereafter, state machine 542 will change from the address generation state $S_{704}$ to the finish state $S_{706}$, as indicated by transition $T_{716}$. The output address generator 124' processes the output (write) data transfer by writing data_out, and upon completion of this data transfer, the state machine 542 decrements the value in the transfer counter 543. If the value of the transfer counter 543 is not equal to zero, and another START signal is received by the state machine 542 over signal line 562, the state machine 542 changes from the finish state $S_{706}$ to the address generation state $S_{704}$, as indicated by transition $T_{718}$. The process of generating another random write address is then repeated as part of the batch (burst) of data transfer. However, if the value of the transfer counter 543 is zero, then the state machine 542 returns to the idle state $S_{702}$, as indicated by transition $T_{720}$. Upon returning to the idle state $S_{702}$, the output address generator 124' becomes available to receive the next batch of data transfers and a new corresponding transfer count value to be loaded into the transfer counter 543 from the control bus 150.

Figure 8:
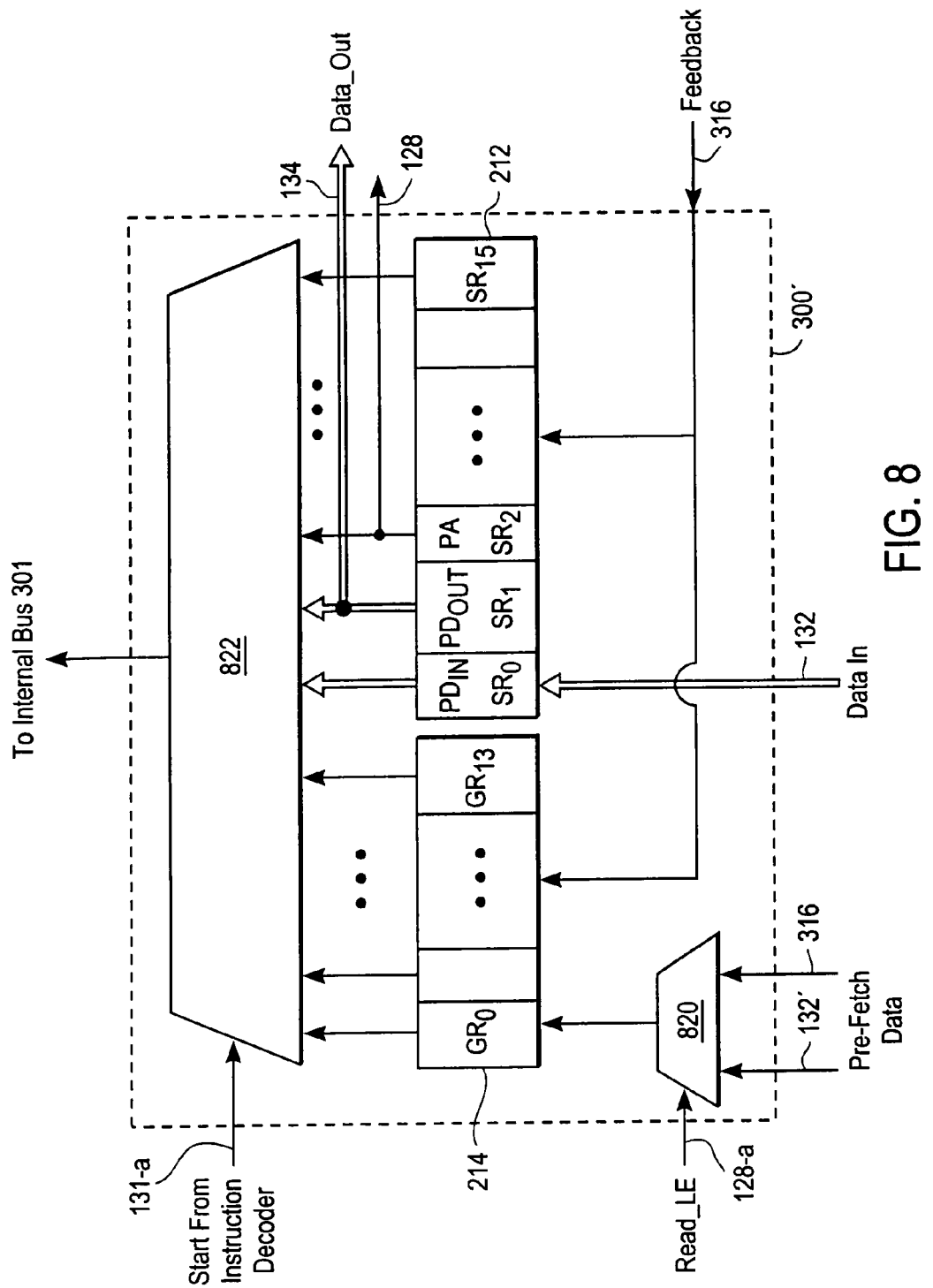
FIG. 8 is a detailed block diagram of one embodiment of the I/O registers of FIG. 3.

FIG. 8 illustrates an exemplary embodiment of the I/O registers 300 with additional details. As shown in FIG. 8, I/O register 300' includes special registers 212, general registers 214, a selector 820 and a selector 822. Special registers 212 are labeled $SR_0$ through $SR_{15}$, and general registers 214 are labeled $GR_0$ through $GR_{15}$. Both the special registers 212 and general registers 214 are described in the Video Processing Application, and in Table 2 of the Interleaved ALU Subsystem Application.

Selector 820 can be implemented with a multiplexer, and functions to select either pre-fetched data over signal line 132' or feedback data 316 from the data selector 211 of FIG. 3. Selector 820 is controlled by the READ_LE signal provided over signal line 128-$a$, and which is generated by state machine 442 of FIG. 4. Signal line 132' is part of the read data (data_in) from device 126 that is received by processing unit 120 over signal lines 132.

Selector 822 can be implemented with a multiplexer, and functions to select data stored in the special registers 212 or the general registers 214, as required for the particular instruction being executed. Details of an exemplary instruction set are described in the Video Processing Application. Selector 822 is controlled by the START signal which is received over signal line 131-$a$ from the instruction decoder of FIG. 2.

Figure 9:
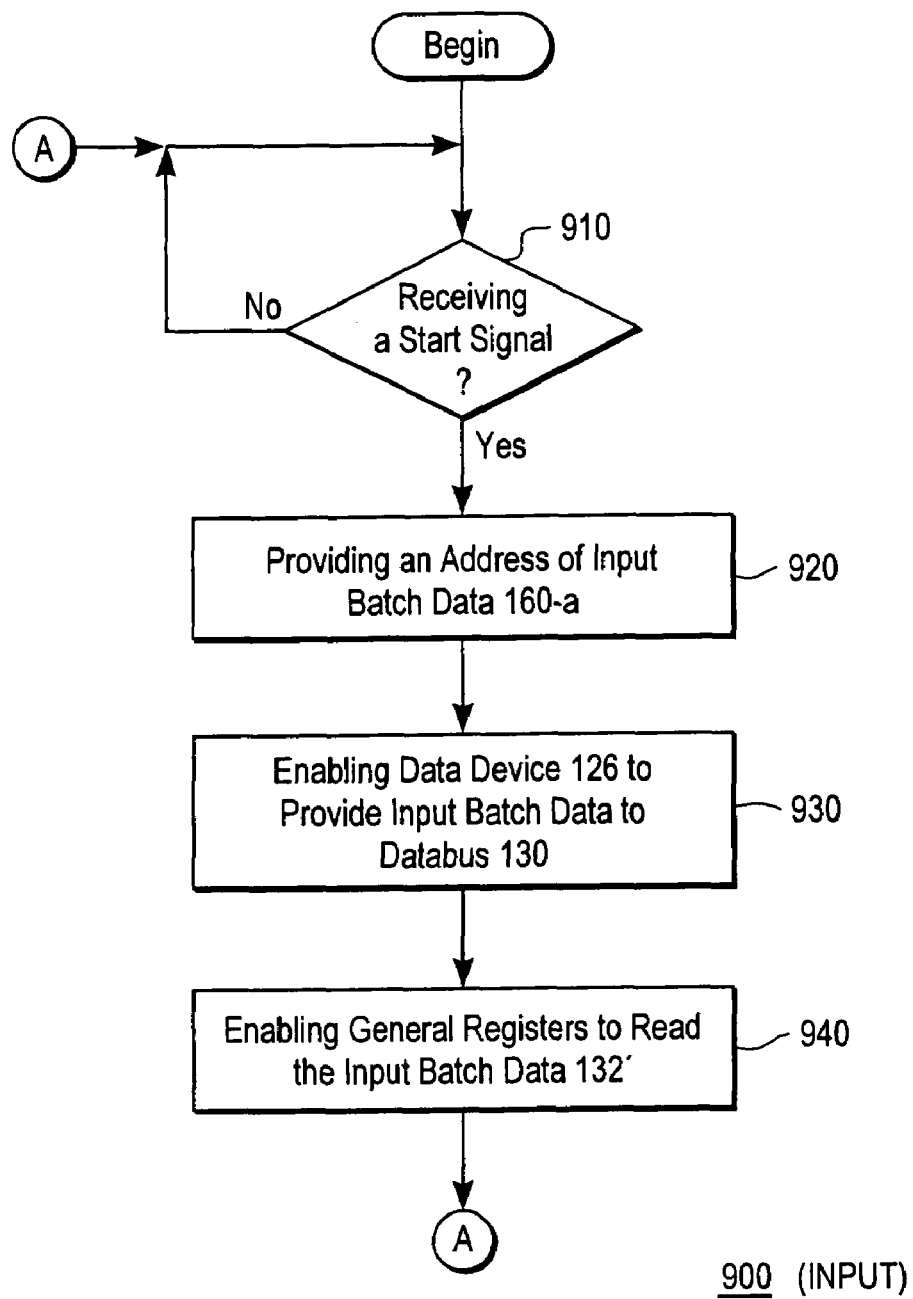
FIG. 9 is a flowchart of a method for the generation of input (read) batch data.

FIG. 9 illustrates a flowchart of a method for generating input addresses 900 in accordance with an aspect of the present invention. Once the START signal is received 910 by state machine 442 in FIG. 4, a read address for the input data is provided 920 in accordance with the previous discussion of FIG. 4. It should be understood that because the input address generator 122 will generate random addresses associated with a macroblock, it is convenient to refer to this data as input batch data. The input batch data is associated with a plurality of data transfers corresponding to the value of the transfer count. Generally, the input batch data implies a number of data transfers being performed by the input address generator 122 independent of processing by the processing unit 120. Device 126 is enabled 930 to provide the input batch data (data_in) to databus 130, in accordance with the read data address generated by the input address generator 122. The general registers 214 are then enabled 940 to read the input batch data (data_in) over signal line 132' as shown in FIG. 8, and the timing diagram of FIG. 11. The process of FIG. 9 repeats upon the state machine 462 receiving another START signal.

Figure 10:
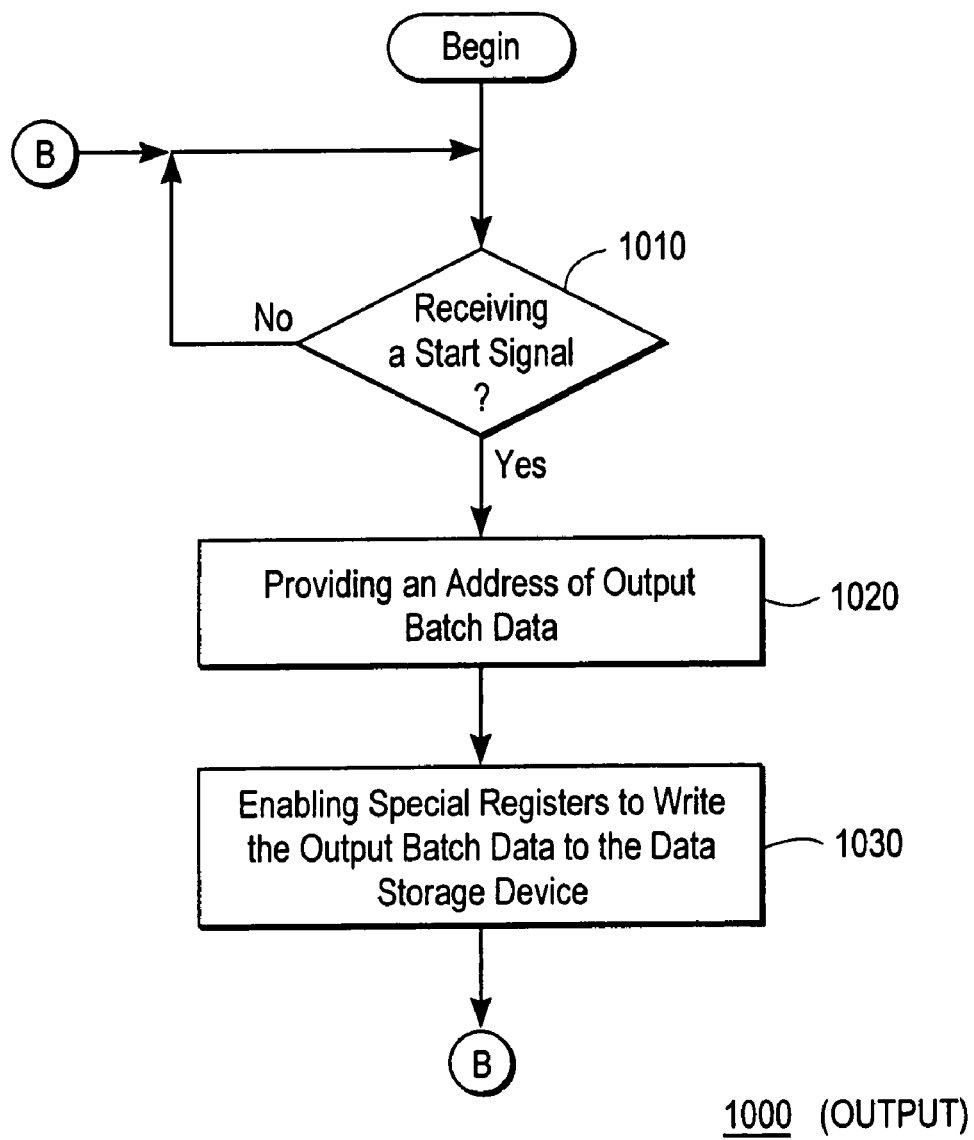
FIG. 10 is a flowchart of a method for the generation of output (write) batch data.

FIG. 10 illustrates a flowchart of a method for generating output addresses 1000 in accordance with an aspect of the present invention. Once the START signal is received 1010 by state machine 542 in FIG. 5, a write address for the output data is provided 1020 over address bus 140, which is coupled to device 126 although not explicitly shown. Similarly to the discussion of input batch data, output batch data refers to a number of data transfers being performed by the output address generator 124 independent of processing by the processing unit 120. The special registers 212 are enabled 1030 to write the output batch data to the device 126 in accordance with the discussion of FIG. 5, and the timing diagram of FIG. 12. The process of FIG. 10 repeats upon the state machine 562 receiving another START signal.

Although the invention has been described in considerable detail with reference to certain embodiments, other embodiments are possible. As will be understood by those of skill in the art, the invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A video processing system enabled to process input and output batch data instructions, comprising:

means for generating random input addresses from linear input addresses, the random input addresses corresponding to input data read from device means;

coupled in parallel to the means for generating random input addresses, means for generating random output addresses, the random output addresses corresponding to output data to be stored in the device means; and coupled to the means for generating random input and random output addresses, processing means capable of performing arithmetic and logic calculations associated with the input addresses and the output addresses.

2. The data processing system according to claim 1, wherein means for generating random input addresses includes linear address generation means.

3. The data processing system according to claim 1, wherein means for generating random output addresses includes linear address generation means.

4. The data processing system according to claim 1, wherein the device means comprises memory means.

* * * * *